United States Patent [19]
Kautz
[11] Patent Number: 4,965,475
[45] Date of Patent: Oct. 23, 1990

[54] OFFSET ADJUST FOR MOVING COIL TRANSDUCER

[75] Inventor: Thomas O. Kautz, Mequon, Wis.
[73] Assignee: Johnson Service Company, Milwaukee, Wis.

[21] Appl. No.: 381,812
[22] Filed: Jul. 19, 1989
[51] Int. Cl.$^5$ ........................ H02K 7/04; F16K 31/10; G05D 16/02
[52] U.S. Cl. ........................................ 310/13; 137/82; 251/129.01
[58] Field of Search ............... 137/82, 85; 251/129.01, 251/129.18, 337; 267/158, 160, 164; 310/12, 13, 20, 21, 29, 30, 68 B, 36, 116

[56] References Cited

U.S. PATENT DOCUMENTS 1,816,102 7/1931 Waters et al. ........................ 310/21
2,324,292 7/1943 Dremel ................................ 310/29
2,427,806 9/1947 Neild .................................. 267/158
3,004,546 10/1961 Robins et al. ........................ 137/82
3,173,437 3/1965 Adams .
3,529,620 9/1989 Lieber .
3,621,862 11/1971 Wojtecki .............................. 137/82
3,768,772 10/1973 Vischulis .............................. 137/82
3,861,411 1/1975 Mitchell et al. ...................... 137/82
4,512,357 4/1985 Earl ...................................... 137/82
4,527,744 7/1985 Hafner et al. .
4,545,353 10/1985 Gmelin et al. .
4,655,396 4/1987 Taxon et al. .

FOREIGN PATENT DOCUMENTS 103129 8/1980 Japan .................................. 267/164

*Primary Examiner*—Steven L. Stephan
*Assistant Examiner*—D. L. Rebsch
*Attorney, Agent, or Firm*—Foley & Lardner

[57] ABSTRACT

In an electropneumatic transducer, an adjustment spring is used for offsetting the coil in relation to a pneumatic system leakport simply and without hysteresis. One end of the spring supports the suspension element on which the coil is positioned. The offset adjusting spring includes a folded region near the end mounted to the transducer body. A screw mechanism is positioned to compress the sides of the fold toward each other when turned in one direction and allow the sides of the fold to open when turned in the opposite direction. Movements of the sides of the fold flex the adjustment spring, causing the offset to vary adjustably.

14 Claims, 2 Drawing Sheets

OFFSET ADJUST FOR MOVING COIL TRANSDUCER

BACKGROUND OF THE INVENTION

This invention relates to an electropneumatic transducer in which a moving coil is precisely positioned over a valve opening by a unique adjustment spring mechanism.

Electropneumatic transducers are commonly used to transduce electrical current to pneumatic pressure, especially when a high degree of linearity between the two is required. A voice coil, such as the electromagnetic coils used in speaker systems, has been found particularly useful for the electrically responsive element in these transducing devices.

The basic operating principle of the voice coil is well known. Current is supplied to a coil suspended in a radial magnetic field created by a concentric permanent magnet circuit. The current interacts with the magnetic field by impinging at right angles on the turns of the coil. This interaction creates an axial force on the coil, causing the coil to move in the desired direction. The permanent magnet is prevented from moving by being fixed to the frame of the transducer.

In an electropneumatic transducer, this motivating force on the coil can be applied to the outer surface of a precisely manufactured ball sitting in the circular throat of a pneumatic leakport. The electromotive force on the coil, applied to one surface of the ball, balances the force of the airstream from the leakport against the opposing surface of the ball. The more electric current applied to the electromagnet, the greater the force applied against the ball. Conversely, a reduction of electric current applied to the coil lessens the force applied against the ball.

The pneumatic pressure within the system can be regulated, therefore, by varying the pressure applied by the coil to the ball. An increase of current applied to the electromagnet produces more back pressure in the pneumatic system. The pneumatic pressure is similarly reduced by reducing the current provided to the electromagnet. The relationship between current and air pressure is very linear, enabling the air pressure to be precisely controlled by balancing the pressure applied to the opposing inner and outer surfaces of the ball. Other kinds of pressure regulators can, of course, make use of a moving coil system.

As a practical consideration, the mechanism suspending the coil in position within the magnetic field must exactly position the coil over the pneumatic leakport. Exact positioning, including an offset adjustment, is needed to compensate for inevitable manufacturing tolerances and other factors that affect calibration. It is also crucial that the parts of the offset adjusting mechanism, once adjusted, do not slip or shift from their positions. Since the nominal operating travel of the coil in a typical electropneumatic transducer can be as little as approximately 0.001 inches, the slightest shift between the component parts can cause a noticeable unwanted pressure change in the pneumatic system. The offset adjustment mechanism must not allow any such slippage or sliding.

Conventional offset adjustment mechanisms are usually complicated to use, requiring adjustment of a number of parts. In addition, offset adjustments often rely on frictional contact between the parts, making them susceptible to shifting or slipping. Also, the adjustment and operational components in some prior art transducers do not always move freely, and contact between them produces unwanted hysteresis. The general construction of electropneumatic transducers having offset adjusting mechanisms subject to the above-described and other problems is shown in such patents as U.S. Pat. Nos. 3,861,411, to Mitchell et al; 4,512,357, to Earl; 3,768,772, to Vischulis; and 3,004,546, to Robins.

SUMMARY OF THE INVENTION

It is an object of the present invention, therefore, to provide an electromagnetically actuated transducer, including a mechanism for precisely adjusting the offset of the moving coil.

It is another object of the present invention to provide a transducer having an offset correcting mechanism that will not shift or slide from its adjusted position.

It is a further object of the invention to provide a moving coil transducer free from hysteresis caused by frictional contact between components.

It is a still further object of the invention to provide a transducer with an offset adjustment means of simple construction and a minimum of components.

Still another object of the invention is to provide an electromagnetically operated transducer having an offset adjustment with decreased sensitivity to temperature variations.

These and other objects are achieved by inclusion of a novel offset adjustment spring in a suspension means for the moving coil. This adjustment spring is flexed by the turning of an adjustment screw. As will be explained, the unique design of the adjustment spring precludes any motion between it and the adjustment screw at the point of contact between the two. Thus, the coil offset adjustment system of this invention is not susceptible to slipping or sliding, which would make any previous calibration useless.

The adjustment spring of this invention is formed in a folded, generally "V" shaped, configuration, in which the adjustment screw pushes against and flexes one side of the fold or "V". This flexure causes the moving coil suspension mechanism to adjust the offset by flexing upwardly. Similarly, relieving the force applied by the screw to the adjustment spring, by turning it in the opposite direction, forces the spring to flex in the opposite direction and adjust the offset oppositely. Other configurations of the flexure spring are possible, although the "V" shaped embodiment has proven practical.

DETAILED DESCRIPTION OF THE INVENTION

Figure 1:
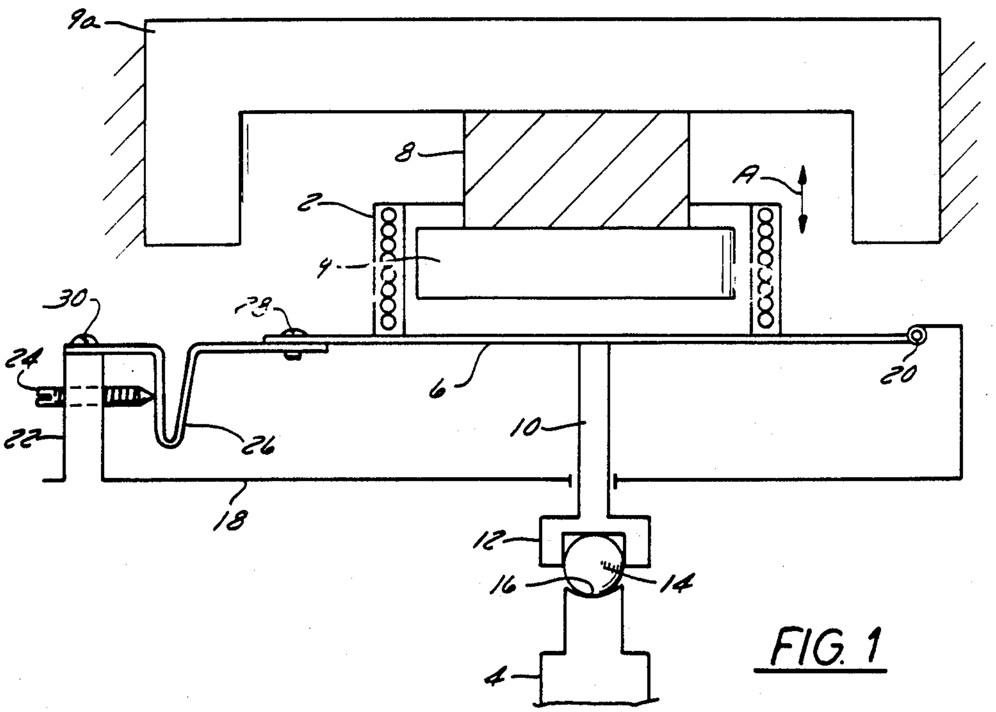
FIG. 1 diagrammatically depicts the invention and its manner of operation.

Referring to FIG. 1, a toroidally-shaped (cylindrical) voice coil 2 constitutes the moving element in an electropneumatic transducer. Coil 2 is suspended in position over leakport 4 by its fixed placement on suspension lever or plate 6. The coil is connected to a current source (not illustrated), by means of which the current can be varied both in amplitude and polarity. A permanent magnet 8, concentric to the coil, provides the needed magnetic field. The magnetic circuit is completed by a pole piece 9, on which magnet 8 is positioned, and magnetic annular cap 9*a*. As is well known in electromagnetic technology, the coil, upon being energized, will move perpendicularly to the direction of the flux field generated by the permanent magnet 8.

In the device of FIG. 1, the direction of coil movement will be up or down, as shown by the arrow A. The polarity of the current applied to the coil determines the direction of movement, while the distance traveled is determined by the amplitude of the current applied to the coil. The permanent magnet circuit components are fixed in position, to prevent their movement. The movement of the coil causes rod 10, fixed to suspension plate 6, to move upwardly or downwardly at the urging of the suspension plate. A cup-like retainer 12 at the end of rod 10 positions precision machined ball 14 within the opening 16 in the throat of leakport 4.

The leakport 4 can be controllably opened or closed, therefore, by the energization of coil 2. When a particular relief pressure is desired, the current applied to coil 2 is set at an amplitude that appropriately positions ball 14 within opening 16. When the desired pressure within the transducer is obtained, the downward pressure of rod 10 is exactly balanced by the pneumatic pressure applied to the bottom surface of the ball.

The transducer of FIG. 1 further includes a base 18, to which the moveable suspension system is fixed. One end of the suspension plate 6 is attached to the base 18 by means of hinge 20. The other end of the base 18 supports the offset adjustment post 22, through which the adjustment screw 24 is threaded.

It is to be understood, however, that the leakport opening and closing mechanism is illustrative only. The present invention is easily adaptable for use with leakports and transducers of various designs.

The exact offset of coil 2 in relation to the ball 14 and the leakport opening 16 is crucial to obtaining and maintaining a precisely controlled pressure within the pneumatic system. As will be explained, this offset is adjusted by the movement of adjustment screw 24 against a folded or "V" shaped flexible adjustment spring 26. One end of the spring 26 is fastened to the suspension plate 6 by a bolt 28 or other conventional means, while the other end of the adjustment spring is permanently affixed to the top of the screw adjustment post 22 by bolt 30.

Offset adjustment is effected by turning the adjustment screw 24 in one direction or the other. Turning the screw in a direction that tends to push the sides of the "V" together causes the suspension plate 6 to move or flex upwardly and raise or elevate the offset position. Allowing the sides of the "V" to relax and spread away from each other by turning the screw oppositely reduces the flexing force on the supporting element and adjusts the offset downwardly.

Figure 2:
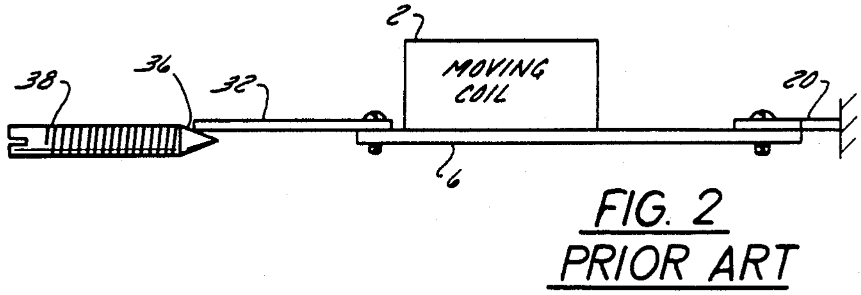
FIG. 2 PRIOR ART
FIG. 2 illustrates the operation and construction of a prior art offset adjustment mechanism for a moving or voice coil in an electropneumatic transducer.

FIG. 2 illustrates a typical prior art offset adjustment mechanism for a moving coil in a transducer, where minute and exact adjustments are critical to its operation. Here and in FIG. 3, for simplicity, the coil 2 is illustrated in the form of a load on suspension plate 6. The permanent magnet 8, rod 10, ball 14 and other leakport components are also not illustrated in either figure, again for simplicity of illustration.

In FIG. 2, suspension plate 6 is supported at one end by the offset adjustment spring 32, and at the other end by a cantilever spring hinge 34. The end of adjustment spring 32 lies on the inclined plane end 36 of an adjusting screw 38. As the screw is turned to travel toward the coil, adjusting spring 32 is raised by the inclined plane against which it rests, which correspondingly upwardly adjusts the offset of moving coil 2. Conversely, the adjustment spring 32 is lowered as the screw 38 is turned to travel away from the coil 2.

Prior art devices of this type are notoriously prone to relative movement between the parts of the offset adjustment mechanism. Thermal expansion and contraction can cause the offset positions to vary, as can even slight movements of the transducer. These offset adjustment systems, therefore, lack the stability of the offset mechanism of this invention.

Figure 3:
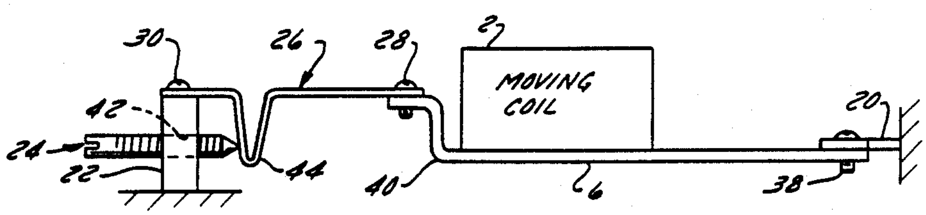
FIG. 3 diagrammatically illustrates the construction and operation of an offset adjustment mechanism for an electropneumatic transducer, according to the present invention.

Referring to FIG. 3, which depicts an embodiment of the present invention, the suspension plate 6 is attached to cantilever hinge 20 by means of bolt 38. (Features or components of the invention shown in various figures are identified by the same number.) The other end of the suspension plate 6 is attached to the adjustment spring 26 by bolt 28. In this embodiment, the end 40 of the suspension plate 6 is bent upwardly to contact the end of adjustment spring 26.

The other end of the adjustment spring 26 is fixed by bolt 30 to adjustment post 22. The post, in turn, is fixed to the base of the transducer. The threaded adjusting screw 24 extends through correspondingly threaded passage 42 in adjustment post 22, to contact the "V" shaped portion 44 of the adjustment spring. As can be seen in FIG. 3, the "V" shaped portion is located closer to the "adjustment" end of the adjustment spring 26 than to its "moving coil" end.

The "V" shaped, central fold 44 in the adjustment spring assures a stationary contact area for the adjustment screw to push against. In addition, this "V" shape compensates for any change in the length of the suspension plate 6 needed for the plate to pivot.

Figure 4A:
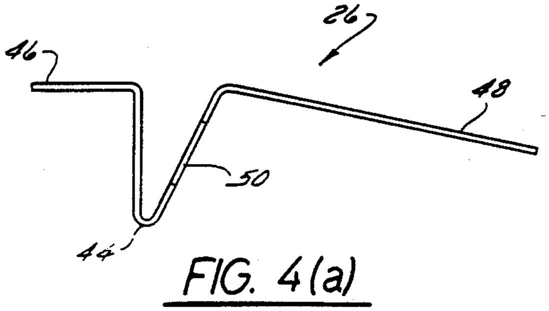
FIGS. 4*a* and 4*b* illustrate plan and perspective views of the configuration of the adjusting spring utilized in the offset adjusting system of the invention.
Figure 4B:
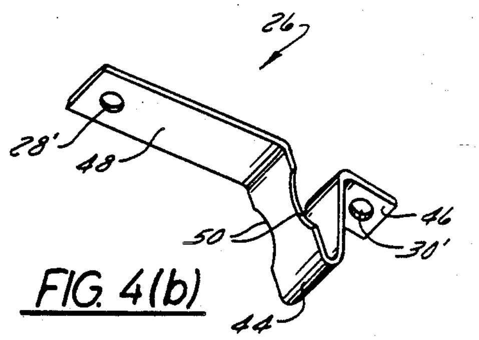

The specific construction of the adjustment spring is seen in FIGS. 4(*a*) and (*b*). In FIG. 4(*a*), the ends of the adjustment spring are seen to be formed in a slightly downward position. This slight downward positioning from the horizontal has been satisfactorily used for portion or side 46, which biases the coil downwardly against the leakport. A relaxed or normal downward orientation of side 48 of about 15° has also been used, along with a "V" shaped opening of about 10°.

The adjustment spring is formed of a material or metal alloy having a low coefficient of thermal expansion and less likely, therefore, to contract or expand under field conditions. A beryllium-copper spring possesses the desired resistance to thermal expansion, while, at the same time, possesses the necessary flexibility.

Beryllium-copper will not reduce the magnetic flux field, a property which additionally lends itself to use in an adjustment spring. Similarly, the suspension plate 6 preferably should be made of a rigid material configurable to include an integral counterweight, and which is also non-magnetic and resistant to thermal expansion and contraction. Zinc components have proven useful for these reasons.

The perspective view of adjustment spring 26, in FIG. 4(*b*), shows two bolt holes 28' and 30' for receiving, respectively, bolts 28 and 30. The side 48 of the "V" portion of the adjustment spring 26 nearest hole 28' is preferably formed in a "dog bone" configuration. The cutouts 50, providing the spring with this configuration, weaken the side in which they are contained and, thereby, help absorb the motion of the suspension plate 6 so that the shorter side of the spring is not forced to move.

Note that the adjustment spring 26 is oriented oppositely in FIG. 4(*b*) than in FIG. 4(*a*). This opposite orientation makes it easier to view and understand the spring's dog-bone configuration.

Figure 5:
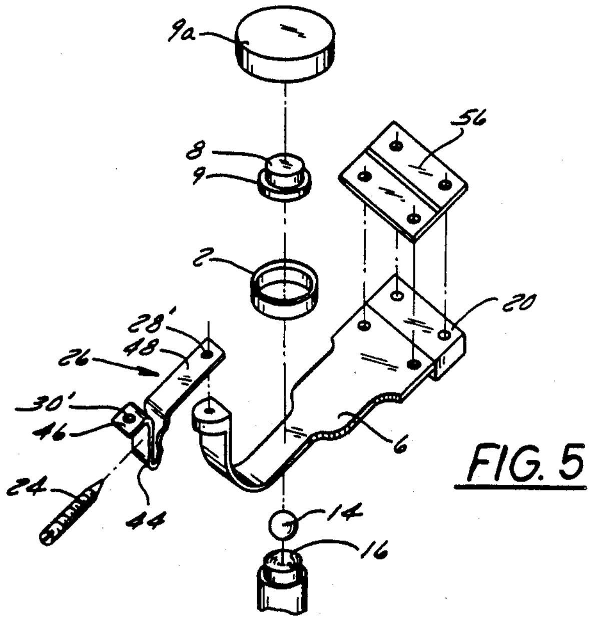
FIG. 5 illustrates, in exploded view, a practical embodiment of the principal components of the invention.

FIG. 5 is an exploded view of the essential components of the invention, as used in a practical embodiment. In this embodiment, a disc shaped pole piece 9, generating the required magnetic field, is positioned within the interior of the coil 2. The magnetic flux path includes the coil 2, the pole piece 9 and a magnetic cap 9*a*. Clamp plates 56, for secure fastening of hinge 20, are additionally shown, while the base 18 has been omitted from the drawing. Otherwise, the offset adjusting spring functions as already described. It is understood, however, that various flux paths other than that of FIG. 1 can be utilized, as, for example, in the prior art.

The foregoing explanation relates to a preferred embodiment of the invention. It is, of course, understood that other variations and embodiments, as would occur to one of ordinary skill in this technology, also lie within the spirit and scope of the invention.

What is claimed is:

1. A coil offset adjusting mechanism for an electropneumatic transducer, comprising:

- a coil suspension means for supporting a coil;
- a lever supporting one end of the coil suspension means;
- an offset adjusting spring supporting the other end of the suspension means, the spring having a fold therein; and
- an adjusting means for pushing the sides of said fold together when moved in one direction and removing compressive pressure on the sides of said fold when moved in an opposite direction, thereby flexing said suspension means and adjusting the offset of said coil.

2. The mechanism of claim 1, wherein the fold is a "V" shaped region.

3. The mechanism of claim 2, wherein one side of the fold has intermediate portions removed to provide a "dog bone" configuration thereof.

4. The mechanism of claim 1, wherein the side of the fold in the spring adjacent the coil is more flexible than the side of the fold adjacent the adjusting means, thereby permitting the end of the spring supporting the supporting means to flex without moving the adjusting means relative to the fold.

5. The mechanism of claim 1, in which the adjusting means comprises a screw mounted to the transducer to contact one side of the fold.

6. The mechanism of claim 5, wherein the movement of the screw in said one direction closes a pneumatic system leakport and movement of the screw in the other direction opens the leakport, thereby regulating pneumatic pressure in a pneumatic system controlled by the transducer.

7. The mechanism of claim 6, wherein the ends of the adjusting spring are formed so that in their natural position the coil is biased in the direction of closing the leakport.

8. The mechanism of claim 1, in which the adjusting spring is made of a non-magnetically permeable material.

9. The mechanism of claim 8, in which the adjustment spring is made of a beryllium-copper alloy.

10. The mechanism of claim 1, in which the suspension means is made of a non-magnetically permeable material.

11. The mechanism of claim 10, in which the suspension means is made of zinc.

12. An offset suspension system for a moveable coil of an electropneumatic transducer comprising:

- support means for supporting said coil having one end which is substantially immobilized;
- a spring having a pair of ends with a first end being substantially immobilized and a second end connected to the other end of said support means, said spring having a fold between said ends thereof; and
- adjusting means for pushing against one side of said fold so as to cause said support means to flex about its immobilized end.

13. The system of claim 12 in which said fold has a V-shaped section.

14. The system of claim 13 in which said adjusting means is a screw mounted to abut one side of said fold.

* * * * *